US008806522B2

(12) United States Patent
Chen et al.

(10) Patent No.: US 8,806,522 B2
(45) Date of Patent: Aug. 12, 2014

(54) GROUP BASED MULTICAST STREAMING SYSTEMS AND METHODS

(75) Inventors: Ming Chen, Bedford, MA (US); George L. Hughes, Wesley Chapel, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 35 days.

(21) Appl. No.: 13/561,804

(22) Filed: Jul. 30, 2012

(65) Prior Publication Data

US 2014/0033243 A1    Jan. 30, 2014

(51) Int. Cl.
*H04N 7/16* (2011.01)

(52) U.S. Cl.
USPC ............................................................. 725/23

(58) Field of Classification Search
USPC ............................................................. 725/23
See application file for complete search history.

(56) References Cited

U.S. PATENT DOCUMENTS

| 7,840,975 B2 * | 11/2010 | Matheny et al. | 725/23 |
| 2004/0268386 A1 * | 12/2004 | Logan et al. | 725/34 |
| 2008/0216107 A1 * | 9/2008 | Downey et al. | 725/22 |

OTHER PUBLICATIONS

P. Basu et al., Pricing Considerations in Video-on-Demand Systems, MCL Technical Report No. 10-09-2000, Department of Electrical and Computer Engineering, Boston University, Boston, MA, http://hulk.bu.edu/pubs/papers/2000/tr-10-09-2000.pdf, as accessed on Apr. 24, 2012.

Shudong Jin et al., Small-World Characteristics of the Internet and Multicast Scaling, Computer Science Department, Boston University, Boston, MA, http://www.cs.bu.edu/fac/best/res/papers/mascots03.pdf, as accessed on Apr. 24, 2012.
Benjamin Edelman et al., To Groupon or Not to Groupon: The Profitability of Deep Discounts, Harvard Business School, Working Paper 11-063, Oct. 19, 2011, http://www.hbs.edu/research/pdf/11-063.pdf, as accessed on Apr. 24, 2012.
Hatem Bettahar, Tutorial on Multicast Video Streaming Techniques, $3^{rd}$ International Conference: Sciences of Electronic Technologies of Information and Telecommunications, Mar. 27-31, 2005, http://www.setit.rnu.tn/last_edition/setit2005/multimedias/92.pdf, as accessed on Apr. 24, 2012.
Wikipedia, Assurance contract, http://en.wikipedia.org/wiki/Assurance_contract, as accessed on Apr. 24, 2012.
Sha Hua et al., Scalable Video Multicast in Hybrid 3G/Ad-hoc Networks, Department of Electrical and Computer Engineering, Polytechnic Institute of New York University, Brooklyn, NY, http://eeweb.poly.edu/faculty/yongliu/docs/TechRep-SV-BCMCS-final.pdf, as accessed on Apr. 24, 2012.

* cited by examiner

*Primary Examiner* — Pankaj Kumar
*Assistant Examiner* — Charles N Hicks

(57) ABSTRACT

Group based multicast streaming systems and methods are disclosed. An exemplary method includes a group based multicast streaming system defines a media multicast streaming event, determines that a group of users satisfies a minimum participation level associated with the media multicast streaming event, and executes, based on the determined satisfaction of the minimum participation level by the group of users, the media multicast streaming event by multicast streaming a media program to the group of users during a timeslot, and provides an incentive to the group of users for participation in the multicast streaming of the media program during the timeslot. Corresponding systems and methods are also disclosed.

23 Claims, 12 Drawing Sheets

Media Multicast Streaming Event Definition
200

Media Program: Movie - Cars

Timeslot: April 21, 8:00-10:00PM ET

Price: $1.00 per participant

Minimum Participation Level: 20 participants

Maximum Participation Level: 100 participants

User Group: To be determined

Fig. 2

Media Multicast Streaming Event Definition
500

Media Program: Movie - Cars

Offer Period: April 10-20

Timeslot: April 21, 8:00-10:00PM ET

Price: $1.00 per participant

Minimum Participation Level: 20 participants

Maximum Participation Level: 100 participants

User Group: To be determined

Fig. 5

Media Multicast Streaming Event Definition
700

Media Program: High School Game - BHS vs. RHS

Request Period: Present – Jan. 20

Timeslot: Jan. 21, 7:00-9:00PM MT

Price: $4.00 per user

Minimum Participation Level: 10 participants

Maximum Participation Level: 50 participants

User Group: 25 users

Fig. 7

GROUP BASED MULTICAST STREAMING SYSTEMS AND METHODS

BACKGROUND INFORMATION

A video-on-demand ("VOD") streaming service traditionally employs unicast streaming technologies to deliver video streams on-demand to user devices over the Internet. The use of unicast streaming technologies imposes limitations on the VOD service provider. For example, in order to fulfill requests for streaming video on-demand, a VOD server operated by the VOD service provider has to transmit an individual unicast video stream to each requesting end-user device. This requirement may consume significant resources of the VOD server and thereby cause the VOD server, a content data network in which the VOD service is located, and/or a VOD service provider operating the VOD server to incur high operational costs to provide the VOD streaming service. In addition, the VOD server may lack resources to fulfill all requests for video streams when a large number of concurrent requests for video streams are received by the VOD server from end users of the video streaming service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2 illustrates an exemplary definition of a media multicast streaming event according to principles described herein.

FIG. 5 illustrates another exemplary definition of a media multicast streaming event according to principles described herein.

FIG. 7 illustrates another exemplary definition of a media multicast streaming event according to principles described herein.

DETAILED DESCRIPTION OF PREFERRED EMBODIMENTS

Figure 1:
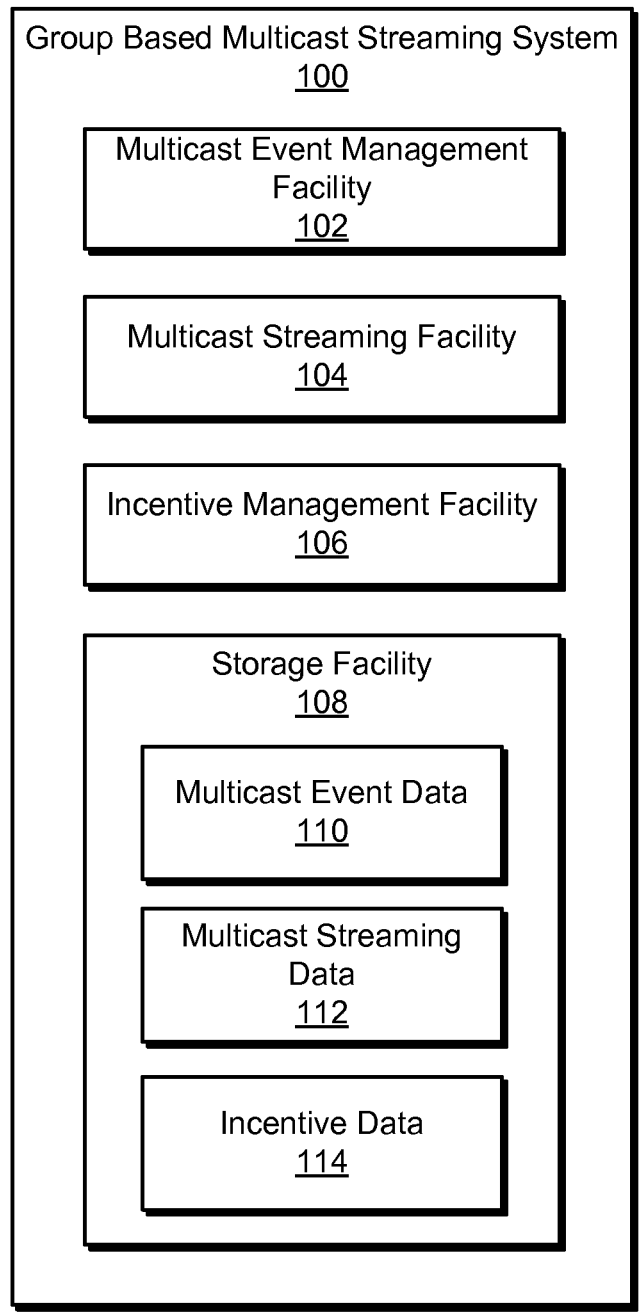
FIG. 1 illustrates an exemplary group based multicast streaming system according to principles described herein.

Exemplary group based multicast streaming systems and methods are disclosed herein. The systems and methods described herein may provide a media multicast streaming event to a group of users. In certain examples, the media multicast streaming event may be conditionally provided based on whether the group of users satisfies a minimum participation level. For example, the systems and methods described herein may determine that the group of users satisfies a minimum participation level associated with the event and, based on this determination, execute the event by multicast streaming a media program to the group of users during a timeslot.

By conditionally providing a media multicast streaming event to a group of users based on satisfaction of a minimum participation level as described herein, the systems and methods described herein may facilitate, without limitation, a conservation of resources used to stream media content (e.g., resources of a media streaming service provider and/or a network service provider), a reduction in operating costs incurred by a media streaming service provider and/or a network service provider, a quality end-user experience with a media streaming service and/or media content (e.g., by promoting simultaneous experiencing of media content by users and/or interaction between the users related to the experiencing of the media content by the users), efficient multicast delivery of media content to the group of users (e.g., multicast streaming in a manner that takes into account and plans for various resources and/or capabilities of end-user devices), and/or an increase in revenue and/or a customer base of a media streaming service provider.

In certain examples, the systems and methods described herein may provide incentives to a group of users for participation in a media multicast streaming event. For example, the systems and methods may provide discounted access to media content based on participation in the media multicast streaming event (e.g., discounted access to a media program that is multicast streamed as part of the event). Accordingly, users included in the group may be able to gain discounted access to media content and/or to receive other incentives for participation in the media multicast streaming event.

End users (e.g., consumers, subscribers, etc.) of a media streaming service may be willing to participate in a media multicast streaming event when incentives are provided for participation in the media multicast streaming event. This may increase levels of participation in media multicast streaming events, which may facilitate and/or enhance one or more benefits experienced by a media streaming service provider and/or a network service provider and/or benefits provided to end users of the media streaming service (e.g., larger incentives may be provided for larger participation levels).

These and/or other benefits provided by the disclosed exemplary systems and methods will be made apparent herein. Exemplary systems and methods will now be described in reference to the accompanying drawings.

FIG. 1 illustrates an exemplary group based multicast streaming system 100 ("system 100"). System 100 may be configured to provide a media multicast streaming event to a group of users. The providing of the media multicast streaming event to the group of users may include system 100 performing one or more of the operations described herein to facilitate access by the group of users to streamed media content. For example, system 100 may conditionally provide a media multicast streaming event to a group of users based on whether the group of users satisfies a minimum participation level associated with the event, such as by determining that the group of users satisfies the minimum participation level and executing, based on the determination, the event by multicast streaming a media program to the group of users during a timeslot, such as described herein. System 100 may be further configured to provide an incentive to the group of users for participation in the media multicast streaming event, such as described herein.

The facilities of system 100 shown in FIG. 1 may include and/or be implemented by one or more computing devices. Exemplary implementations of system 100 and exemplary computing devices are described herein.

It will be recognized that although certain facilities of system 100 are shown to be separate facilities in FIG. 1, any of the facilities may be combined into fewer facilities, such as into a single element, or divided into more facilities as may serve a particular implementation. Additionally or alternatively, in alternative embodiments, any of the facilities of system 100 shown in FIG. 1 may be omitted from system 100, or one or more additional facilities may be added to system 100.

As shown in FIG. 1, system 100 may include, without limitation, a multicast event management facility 102, a multicast streaming facility 104, an incentive management facility 106, and a storage facility 108 selectively and communicatively coupled to one another. The facilities may be communicatively coupled one to another by way of any suitable communication technologies.

Storage facility 108 may be configured to maintain multicast event data 110 generated and/or used by multicast event management facility 102, multicast streaming data 112 generated and/or used by multicast streaming facility 104, and incentive data 114 generated and/or used by incentive management facility 106. Examples of multicast event data 110, multicast streaming data 112, and incentive data 114 are described herein. Storage facility 108 may maintain additional or alternative data as may serve a particular implementation.

Multicast event management facility 102 may be configured to manage a media multicast streaming event (or simply "event"). The management of the event may include multicast event management facility 102 defining the event and maintaining data representing a definition of the event. Multicast event management facility 102 may be configured to define a media multicast streaming event in any suitable way and based on any information accessible by multicast event management facility 102. For example, multicast event management facility 102 may define an event based on data maintained by system 100, on input received from a media streaming service provider, and/or on input received from end users and/or potential end users of a service provided by the service provider. The definition of the event may be represented by one or more data records included in multicast event data 110.

The definition of the event may specify one or more characteristics of the event. For example, the definition of the event may specify, without limitation, a media program associated with the event (e.g., a media program to be multicast streamed when the event is executed), a timeslot for the event (e.g., a timeslot during which a media program is to be streamed when the event is executed), a minimum participation level for the event (e.g., a minimum number of participants in a multicast streaming of a media program during a timeslot), a maximum participation level for the event (e.g., a maximum number of participants in a multicast streaming of a media program during a timeslot), a user group associated with the event, pricing information associated with the event (e.g., a group price for participation in the event, a unit price to be charged to a user for access to media content by way of the event, etc.), and/or any other characteristic of the event.

FIG. 2 illustrates an exemplary definition 200 of a media multicast streaming event. In the illustrated example, definition 200 specifies that a movie titled "Cars" is associated with the event, that the movie is scheduled to be multicast streamed during a timeslot on April $21^{st}$ from 8:00-10:00 PM Eastern Time, that the event has a unit price of one dollar per user, that the event has a minimum participation level of twenty participants, that the event has a maximum participation level of one-hundred participants, and that a user group for the event (e.g., a group of users who have agreed to participate in the event) has yet to be determined or finalized.

In some examples, multicast event management facility 102 may define an event over time. For example, multicast event management facility 102 may initially define one or more characteristics of the event and subsequently define one or more other characteristics of the event. To illustrate, multicast event management facility 102 may initially generate definition 200 to include the information shown in FIG. 2. Subsequently, multicast event management facility 102 may update definition 200 to include data representative of users who have been added to the group of users associated with the event since the initial generation of definition 200.

Examples of multicast event management facility 102 defining an event and/or determining characteristics of the event to include in the definition of the event are described herein.

Multicast event management facility 102 may be configured to condition execution of a defined event on satisfaction of a minimum participation level associated with the event (e.g., on a minimum participation level included in the definition of the event). If the minimum participation level is not satisfied, the event may not be executed. Conversely, if the minimum participation level is satisfied, the event may be executed.

To this end, multicast event management facility 102 may be configured to determine whether a minimum participation level for an event is satisfied (e.g., whether a group of users who have requested or agreed to participate in the event satisfies the minimum participation level). The determination may be made in any suitable way. For example, multicast event management facility 102 may compare a number of users included in an identified group of users associated with the event (e.g., the group of users identified in the definition of the event) to the minimum participation level for the event (e.g., the minimum participation level identified in the definition of the event). The determination may be made at any suitable time, such as before an execution of the event (e.g., before the start of a timeslot during which execution of the event is to be performed).

If multicast event management facility 102 determines that the minimum participation level is not satisfied by the user group, multicast event management facility 102 may cancel execution of event and notify the users included in the group that the minimum participation level has not been met. Alternatively, multicast event management facility 102 may notify users included in the group that the minimum participation level has not been met and offer to provide the event to the current group of users at an increased price point due to the current participation level being lower than the minimum participation level.

If multicast event management facility 102 determines that the minimum participation level is satisfied by the user group, multicast event management facility 102 may perform one or more operations in response to or otherwise based on this determination. For example, multicast event management facility 102 may register the group of users for the event, prepare for execution of the event, and/or provide output to direct multicast streaming facility 104 to execute the event and/or schedule the event for execution during the timeslot associated with the event.

Multicast event management facility 102 may register the group of users for the event and/or prepare for the execution of the event by obtaining information about the users and/or the user devices associated with the users included in the group and that may be helpful for execution of the event. For example, multicast event management facility 102 may communicate with the user devices associated with the group of users to request and receive information about end user device resources and/or capabilities (e.g., screen resolution information, media encoder/decoder information, processing capability information, memory availability information, network connection information, end user device physical and/or network location information, and/or any other information about end user devices).

Additionally or alternatively, multicast event management facility 102 may direct the user devices associated with the group of users to prompt the users to input information about the users and/or the user devices associated with the users that may be helpful for execution of the event. For example, multicast event management facility 102 may request that a user provide input to indicate a particular computing device that the user plans to use to access media content during execution of the event.

Additionally or alternatively, multicast event management facility 102 may access information about the users and/or the user devices associated with the users from profile data (e.g., user and/or device profile data maintained by a service provider) maintained or otherwise accessible by multicast event management facility 102.

By multicast event management facility 102 obtaining such information about the users and/or the user devices associated with the group of users, system 100 may be able to tailor the execution of the event to the specific users and/or user devices. For example, multicast event management facility 102 may obtain such information well before the start of a timeslot during which the event is scheduled to be executed. This may give system 100 sufficient time to perform certain operations to tailor the execution of the event to certain user devices. Time to perform such operations may be insufficient if the information were not obtained early enough in advance of the start of the timeslot. To illustrate, based on information obtained through registration of a user, system 100 may be configured to obtain or generate a copy of a media program that is tailored to a specific user device associated with the user (e.g., a user device that has a particular screen resolution, bit rate, and/or media decoder), such as by encoding the media program in a format that is well-suited to the user device.

By obtaining and using information about users and/or user devices to prepare for execution of a multicast streaming event in advance of the execution of the multicast streaming event, multicast event management facility 102 may overcome and/or mitigate one or more challenges associated with traditional multicasting. For example, one challenge of traditional multicasting is a problem known as "receivers' heterogeneity," which refers to problems that may be caused by different receivers of multicast content having different network access speeds, different quality of service ("QoS") standards, different network bandwidth constraints, and/or different content processing capabilities. This heterogeneity issue may be mitigated by obtaining and using information about the receiver devices to prepare in advance for a multicast streaming session.

In certain examples, for instance, multicast event management facility 102 may use obtained user device information to determine characteristics of media stream data that are well suited for user devices that will be receiving a multicast stream. Multicast event management facility 102 may then prepare and/or direct one or more elements of system 100 to prepare layered media coding in which raw media data is encoded into a set of cumulative or non-cumulative layers. A basic layer may contain essential media data with a basic low quality. A set of enhancement layers may contain additional media data that improves the quality of the media. A media stream that contains the layered media coding may be multicast streamed to the user devices as described herein, and each user device may select and use one or more of the media layers to access and process the media at a level of quality that is well suited for the user device.

Additionally or alternatively, a group of users who share a common interest in a media program and have agreed to a particular timeslot for a multicast streaming event may tend to be associated with user devices that are more homogeneous than receiver devices in other multicasting situations. This may help mitigate the heterogeneity issue.

Another challenge with multicasting is the construction of a dynamic routing tree and the handling of random additions and deletions of users to/from the tree during a multicasting session. By defining a media multicast streaming session as described herein, multicast event management facility 102 may mitigate the problems associated with this challenge. For example, as described herein, users have agreed to participate in a media multicast streaming event during a particular timeslot. Consequently, the multicast dynamic routing tree for the event may tend to be more stable than such a routing tree would be in other multicasting situations.

Additionally or alternatively, in certain examples, system 100 may be configured to implement, interact with, and/or otherwise use one or more cloud and/or software defined networks to implement dynamic multicasting in any of the ways described herein. Such an implementation may be effective in handling dynamic multicasting and may mitigate one or more of the challenges traditionally associated with dynamic multicasting and the dynamic adding or dropping of participants to/from a multicast streaming session.

After preparation for execution of the event is complete, multicast event management facility 102 may provide output to direct multicast streaming facility 104 to execute the event and/or schedule the event for execution during the timeslot associated with the event. Multicast event management facility 102 may direct multicast streaming facility 104 in any suitable way and/or at any suitable time. For example, multicast event management facility 102 may communicate with multicast streaming facility 104 approximately at the start of the timeslot associated with the event to trigger a multicast streaming of a media program during the timeslot. Alternatively, multicast event management facility 102 may communicate with multicast streaming facility 104 in advance of the start of the timeslot, and multicast streaming facility 104 may be configured to schedule the multicast streaming of a media program at the timeslot. Examples of multicast streaming facility 104 multicast streaming a media program are described herein.

Returning to FIG. 1, multicast streaming facility 104 may be configured to execute a media multicast streaming event by multicast streaming a media program to a group of users event during a timeslot associated with the event. Multicast streaming facility 104 may be configured to multicast stream the media program in accordance with instructions and/or information received from multicast event management facility 102, which may facilitate efficient multicast streaming, such as described herein. Multicast streaming facility 104 may employ any suitable media multicast streaming technologies to multicast media content to a group of users associated with the event. For example, multicast streaming facility 104 may employ, without limitation, Internet Protocol ("IP") streaming technology, progressive media streaming technology, adaptive rate Hypertext Transfer Protocol ("HTTP") media streaming technology, and other suitable communications and/or data transport technology (e.g., other media streaming technology), or any combination or sub-combination thereof.

Figure 3:
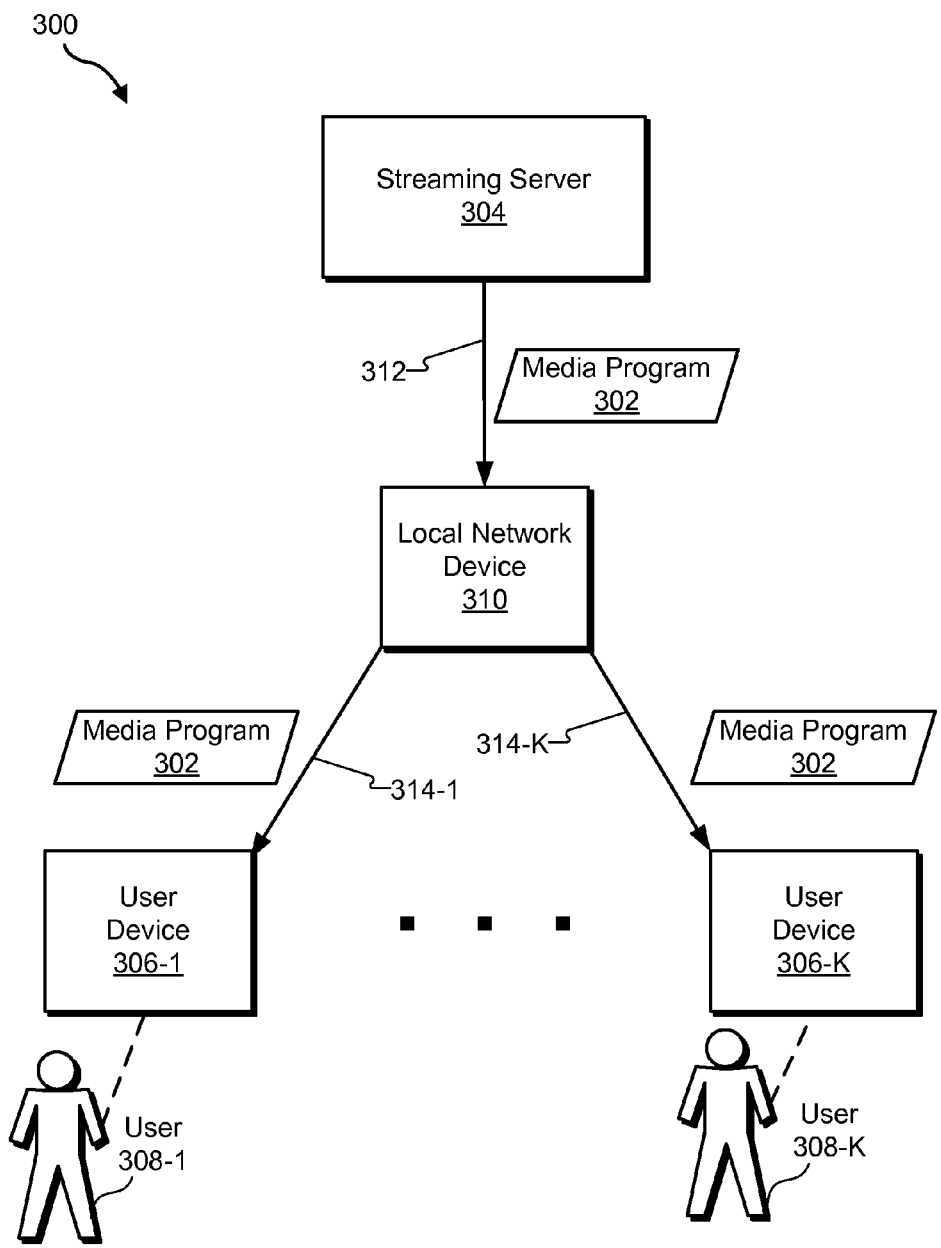
FIG. 3 illustrates an example of multicast streaming of a media program by an implementation of the system of FIG. 1 according to principles described herein.

FIG. 3 illustrates an exemplary multicast streaming 300 of a media program 302 from a streaming server 304 to user devices 306 (e.g., user devices 306-1 through 306-K) associated with (e.g., operated by) a group of users 308 (e.g., users 308-1 through 308-K) by way of a local network device 310. As shown, streaming server 304 may transmit a single stream 312 carrying data representative of media program 302 to local network device 310, which may receive and process media program 302 (e.g., to create multiple streams carrying media program 302) and transmit individual streams 314 (streams 314-1 through 314-K) each carrying data representative of media program 302 to user devices 306.

By multicasting media program 302 in this or a similar manner, resources of streaming server 304 and/or network resources between streaming server 304 and local network device 310 may be conserved, particularly in comparison to a traditional unicast media streaming model. In addition, the multicast streaming of media program 302 may facilitate users 308 simultaneously experiencing media program 302, which may promote an interactive and/or quality experience between users 308 based on their experiencing of media program 302.

System 100 may be implemented by one or more of the computing devices shown in FIG. 3. For example, any of facilities 102-108 may be implemented entirely by streaming server 304, by a combination of streaming server 304 and local network device 310, distributed across streaming server 304 and user devices 306, or distributed across streaming server 304, local network device 310, and user device 306.

Streaming server 304 may include one or more servers and/or other computing devices configured to perform one or more of the server-side operations described herein. Streaming server 304 may be configured to stream media content. Streaming server 304 may maintain the media content and/or access the media content from one or more media content sources. Streaming server 304 may be configured to stream media content to users as part of a media streaming service.

Local network device 310 may include any network device that is communicatively disposed between streaming server 304 and user devices 306. For example, local network device 310 may include a network device at an edge of a content delivery network, a router, a gateway, a network device at a data center (e.g., a data center that is geographically or communicatively more proximate to user devices 306 than in streaming server 304) within a content delivery network, and/or any other computing device or set of computing devices disposed between streaming server 304 and user devices 306 and configured to participate in multicast streaming of media content as described herein.

User devices 306 may include or be implemented by any end-user computing devices configured to access one or more services provided by streaming server 304. Examples of user devices 306 may include, but are not limited to, mobile phones, smart phones, tablet computers, personal computers, mobile computing devices, vehicular computing devices, set-top box devices, network-enabled televisions, gaming console devices, and media player devices.

User devices 306 may communicate with streaming server 304 (e.g., by way of local network device 310 in some cases) using any suitable communication technologies, including communication technologies that support delivery of media content from streaming server 304 to one or more user devices 306. Examples of such communication technologies may include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), in-band and out-of-band signaling technologies, wide area network communication technologies, Internet communication technologies, Hypertext Transfer Protocol ("HTTP"), any suitable media streaming technologies (including any of those mentioned herein), and other suitable communications and/or data transport technologies, or any combination or sub-combination thereof.

In certain examples, user devices 306 may communicate with streaming server 304 by way of a network, which may include one or more networks provided by one or more appropriately configured network devices (and communication links thereto) and over which media content may be transported between computing devices such as from streaming server 304 to one or more user devices 306. The network may include, but is not limited to, a mobile phone network (e.g., a cellular phone network, a 3G data network, a 4G data network, etc.), a satellite media broadcasting network, a terrestrial media broadcasting network, a wide area network, the Internet, and/or any other network(s) capable of transporting media content between computing devices.

User devices 306 may be configured to access a media stream and process data representative of media content carried by the media stream. For example, user devices 306 may present the streamed media content for experiencing by users 308.

As used herein, "media content" may refer to any media content program or set of media content programs. A "media program" may refer to any instance of media content that may be delivered by way of streaming the media program. For example, a media program may include a television program, a movie, a video program, an audio program (e.g., a song), a pay-per-view program, IPTV media content, or any segment, component, or combination of these or other forms of media content that may be processed (e.g., temporally played back) by a media content processing device for experiencing by a user.

Returning to FIG. 1, incentive facility 106 may be configured to provide incentives to one or more users included in a group of users for participation in media multicast streaming events. For example, system 100 may provide a media multicast streaming event to a group of users in any of the ways described herein, and incentive facility 106 may provide an incentive to the group of users for participation in the event. To illustrate, the event may include multicast streaming of a media program to the group of users during a timeslot, and incentive facility 106 may provide the group of users with an incentive, such as discounted access to the media program, to reward or otherwise incentivize the group's participation in the event (e.g., to reward the group's participation in the multicast streaming of the media program). Such an incentive may incentivize participation in media multicast streaming events.

Incentives may be in any form configured to incentivize user participation in media multicast streaming events and may be provided to users in any suitable way. For example, incentive facility 106 may provide incentive data representative of incentives to user devices of users. The incentive data may include information configured to inform users of potential for earning rewards and/or designed to motivate uses to perform certain actions to earn rewards. For example, the incentive data may inform users of requirements that may be fulfilled to earn a reward. Additionally or alternatively, the incentive data may include information configured to inform users of earned rewards. The potential for earning rewards and/or the actual earning of rewards may motivate the users to perform certain actions, such as actions that may be lead to additional rewards being earned. The users may utilize their respective user devices to access, use, and/or be informed of the incentives provided by incentive facility 106.

Examples of incentives that may be provided by incentive facility 106 include, without limitation, discounted and/or subsidized access to a service (e.g., discounted service subscription fees such as a free or otherwise discounted month of access to a service), discounted access to media content (e.g., free or otherwise discounted access to a media program), credit for use toward accessing media content (e.g., a credit for use toward renting or purchasing media content), and a mystery reward configured to be revealed after a member satisfies one or more predefined criteria to earn the reward. Additional or alternative forms of incentives may be provided in other examples.

Incentive facility 106 may be configured to determine a particular incentive to provide to a user for participation in a media multicast streaming event in any suitable way. For example, incentive facility 106 may determine an incentive based on input provided by a media multicast streaming service provider. For instance, the service provider may provide input indicating that participants in a particular media multicast streaming event will receive access to a media program for a discount amount (e.g., for a price of one dollar, which may be a certain discount amount less than a regular price to access a media program). Incentive facility 106 may provide data representative of a determined incentive to multicast event management facility 102.

Multicast event management facility 102 may be configured to use incentive data received from incentive facility 106 to define an event. For example, multicast event management facility 102 may use the incentive data to generate or update definition 200 such that the unit price associated with the event represented by definition 200 reflects an incentive amount determined by incentive facility 106. For instance, multicast event management facility 102 may define the unit price to be one dollar, which may be the discounted price after the incentive amount has been applied.

In certain examples, multicast event management facility 102 may use incentive data received from incentive facility 106 to determine a minimum and/or maximum participation level for an event. For example, multicast event management facility 102 may maintain or access data representative of a multicast event price model, and apply pricing information received from incentive facility 106 and associated with an event to the multicast event price model to determine a minimum and/or maximum participation level for an event. To illustrate, multicast event management facility 102 may determine a unit price for a media multicast streaming based on information received from incentive facility 106. Multicast event management facility 102 may apply the unit price to the price model to determine a minimum and/or maximum participation level for the event.

Figure 4:
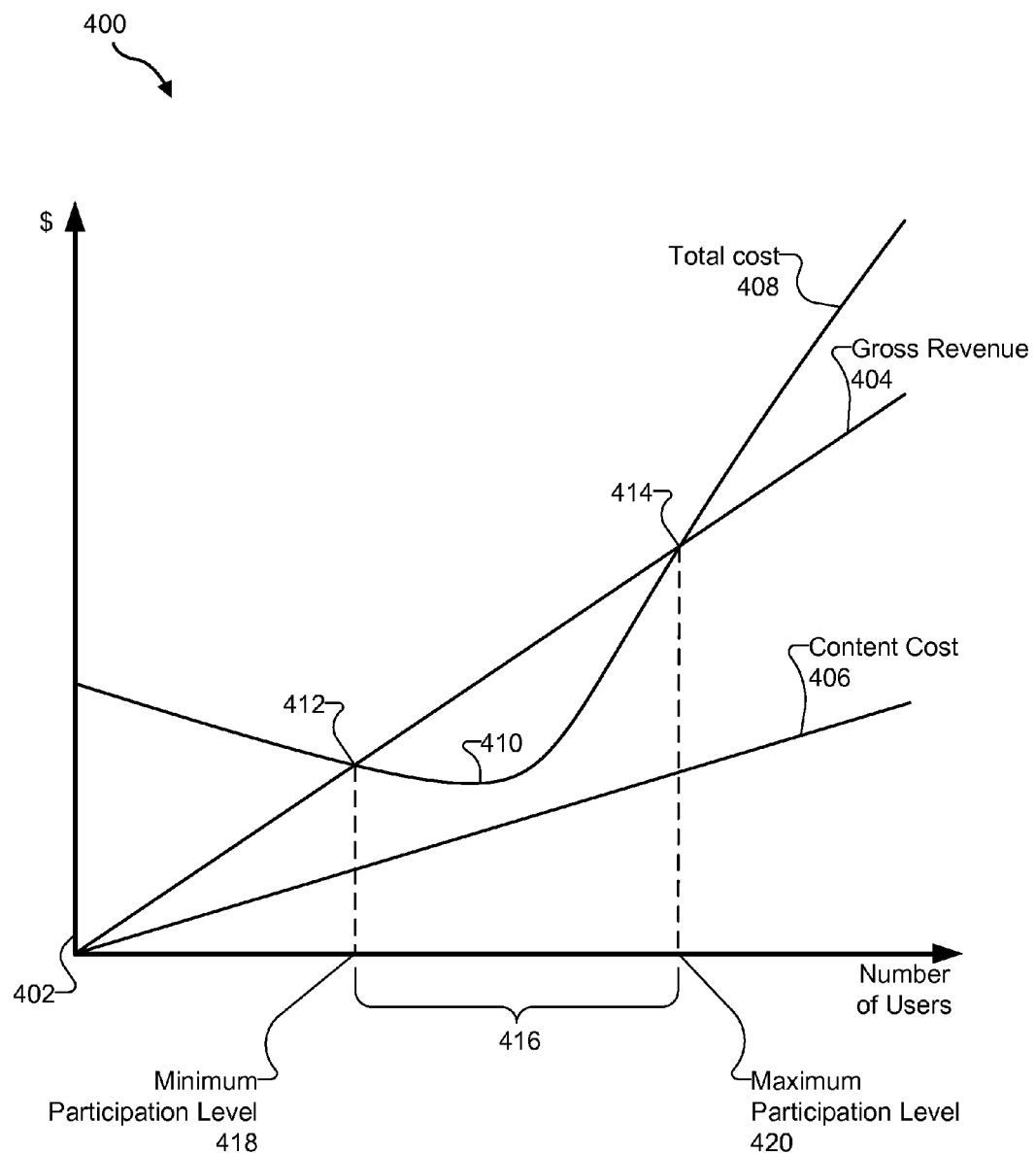
FIG. 4 illustrates an exemplary group multicast streaming price model according to principles described herein.

To further illustrate, FIG. 4 shows an exemplary group multicast price model 400 represented in a graph 402 having a number of users participating in an event plotted along the x-axis and a dollar amount plotted along the y-axis. Price model 400 may be defined by a media multicast service provider, and data representative of the price model 400 may be maintained and/or accessed by multicast event management facility 102 in any suitable form.

Line 404 of FIG. 4 may represent gross revenue that may be collected by the service provider from users for participation in a media multicast streaming event. The gross revenue may be derived from the unit price per user and the number of users participating in the event (e.g., the number of users who pay the unit price to access a media program). As shown, gross revenue may increase linearly as the number of users who pay to participate in a media multicast streaming event increases.

Price model 400 may also represent costs associated with providing the media multicast streaming event (e.g., cost incurred by the media multicast service provider to provide the event). Line 406 of FIG. 4 may represent content costs, which may include costs for obtaining media content from a content provider (e.g., fees paid by the media multicast streaming provider to a content source for access to the media content). As shown, in certain examples, the content costs may increase linearly as the number of users who pay to participate in a media multicast streaming event increases.

Line 408 of FIG. 4 may represent total costs associated with providing the media multicast streaming event. The total costs may include the content costs represented by line 406 and any other costs incurred by a media multicast service provider to provide the event. For example, the total costs may include content costs, content storage costs, content delivery costs, and media multicast streaming event management/administration costs.

As shown by line 408, for a certain range along the x-axis, the total costs may generally decrease due to the economies of scale provided by media multicast streaming allowing average content storage and/or delivery costs per user to decrease as the number of users who pay to participate in the media multicast streaming event increases. However, multicast scaling factors may reach a threshold, after which the average content storage and/or delivery costs per user may reverse and increase in amount as the number of users who pay to participate in the media multicast streaming event increases. Accordingly, at a certain threshold number of participants, represented at position 410 in FIG. 4, the total costs to provide the event begin to generally increase as the number of users who pay to participate in the media multicast streaming event increases. After position 410, the total costs may continue to generally increase as the number of participants in the event increases.

At position 412 shown in FIG. 4, total costs equal gross revenue. Position 412 may represent a "break even" point for the media multicast streaming event, meaning that the number of participants corresponding to position 412 are needed for the service provider to financially break even in providing the event. As gross revenue increases and total costs decrease along the x-axis after position 412 (as the number of participating users increases), the service provider may make a profit (e.g., gross revenue subtract total costs) from the event.

At position 410, the total costs begin to increase as the number of participant increases at a rate that is higher than the rate at which the gross revenue for the event increases. Accordingly, as shown in FIG. 4, at position 414, the totals costs may again equal gross revenue. Position 414 may represent a "stop" point for the media multicast streaming event. If the service provider allowed the number of participants to continue to increase past position 414, the service provider may incur a loss (e.g., gross revenue minus total costs) from the event.

Accordingly, to make a profit from the event, the service provider may want to restrict event participation to be within a range of participation levels indicated by bracket 416 in FIG. 4. To enforce the restriction, multicast event management facility 102 may be configured to use price model 400 to determine a minimum participation level 418 and a maximum participation level 420, which correspond to the endpoints of the range of participation levels indicated by bracket 416. Multicast event management facility 102 may define the event to include the minimum and maximum participation levels 418 and 420. For example, definition 200 of an event shown in FIG. 2 specifies a minimum participation level of twenty participants and a maximum participation level of one-hundred participants, which levels of participation may be determined based on price model 400 and correspond to minimum participation level 418 and maximum participation level 420, respectively.

In this or a similar manner, multicast event management facility 102 may determine minimum and/or maximum participation levels for an event. As described herein, multicast event management facility 102 may be configured to require satisfaction of the minimum participation level before executing the event. Multicast event management facility 102 may be further configured to cap participation at the maximum participation level.

Alternative to selecting minimum and maximum participation levels that exactly correspond to the break even position 412 and the stop position 414 of price model 400, multicast event management facility 102 may be configured to offset the minimum and maximum participation levels from these positions, which may help to further maximize and/or ensure profitability of the event. For example, multicast event management facility 102 may be configured to incorporate a five-user offset by adding five users to the number of users that corresponds to the break even position 412 and subtracting five users from the number of users that corresponds to the stop position 414. This may provide a buffer to the range of participation and help maximize and/or ensure profitability of the event.

Returning to FIG. 1, in certain examples, system 100 may be configured to provide a media multicast streaming event in accordance with a "group offer" mode and/or a "group bid" mode. For example, multicast event management facility 102 may be configured to define the media multicast streaming event in accordance with either a "group offer" mode or a "group bid" mode.

In a "group offer" mode, multicast event management facility 102 may generate an initial definition of a media multicast streaming event. The initial definition may be generated based on data maintained and/or accessed by multicast event management facility 102. In certain examples, a media multicast streaming service provider may provide input that multicast event management facility 102 may use to generate the initial definition of the event.

The initial definition of the event may specify one or more characteristics of the event. For example, the definition of the event may specify, without limitation, a media program associated with the event (e.g., a media program to be multicast streamed when the event is executed), a timeslot for the event (e.g., a timeslot during which a media program is to be streamed when the event is executed), a price point for the event, a minimum participation level for the event (e.g., a minimum number of participants in a multicast streaming of a media program during a timeslot), a maximum participation level for the event (e.g., a maximum number of participants in a multicast streaming of a media program during a timeslot), an offer period during which an offer to participate in the event is distributed and users are able to agree to participate in the event, and/or any other characteristic of the event.

FIG. 5 illustrates an exemplary initial definition 500 of a media multicast streaming event. In the illustrated example, definition 500 specifies that a movie titled "Cars" is associated with the event, an offer period during which users may agree to participate in the event is from April 10-20, the movie is scheduled to be multicast streamed during a timeslot on April 21$^{st}$ from 8:00-10:00 PM Eastern Time, the event has a minimum participation level of twenty participants, the event has a maximum participation level of one-hundred participants, and that a user group for the event (e.g., a group of users that have agreed to participate in the event) has yet to be determined.

With definition 500 generated, multicast event management facility 102 may provide an offer for the event to potential participants in the event. The offer may be provided to potential participants in any suitable way. For example, multicast event management facility 102 may release the offer for distribution by way of one or more advertisement distribution channels. The offer may then be distributed, such as by distributing data representative of the offer as one or more advertisements in any suitable form (e.g., banner advertisements, social networking messages, email messages, text messages, etc.). In certain examples, multicast event management facility 102 may distribute the offer to members of an online community (e.g., members of a hosted online community), members of a social networking site, subscribers to a service (e.g., subscribers to a media streaming service, a subscriber television service, a communications service, and/or one or more other services), visitors to a website, and/or any other set of potential participants in the event.

One or more recipients of the offer provided by multicast event management facility 102 may choose to accept the offer and respond to multicast event management facility 102 to indicate their acceptance of the offer. For example, a user who has received the offer may provide input to a user device to indicate the intent of the user to accept the offer to participate in the media multicast streaming event, and the user device may send data representative of an offer acceptance to multicast event management facility 102. Multicast event management facility 102 may use such received acceptances to identify a group of users who have agreed to participate in the event.

Figure 6:
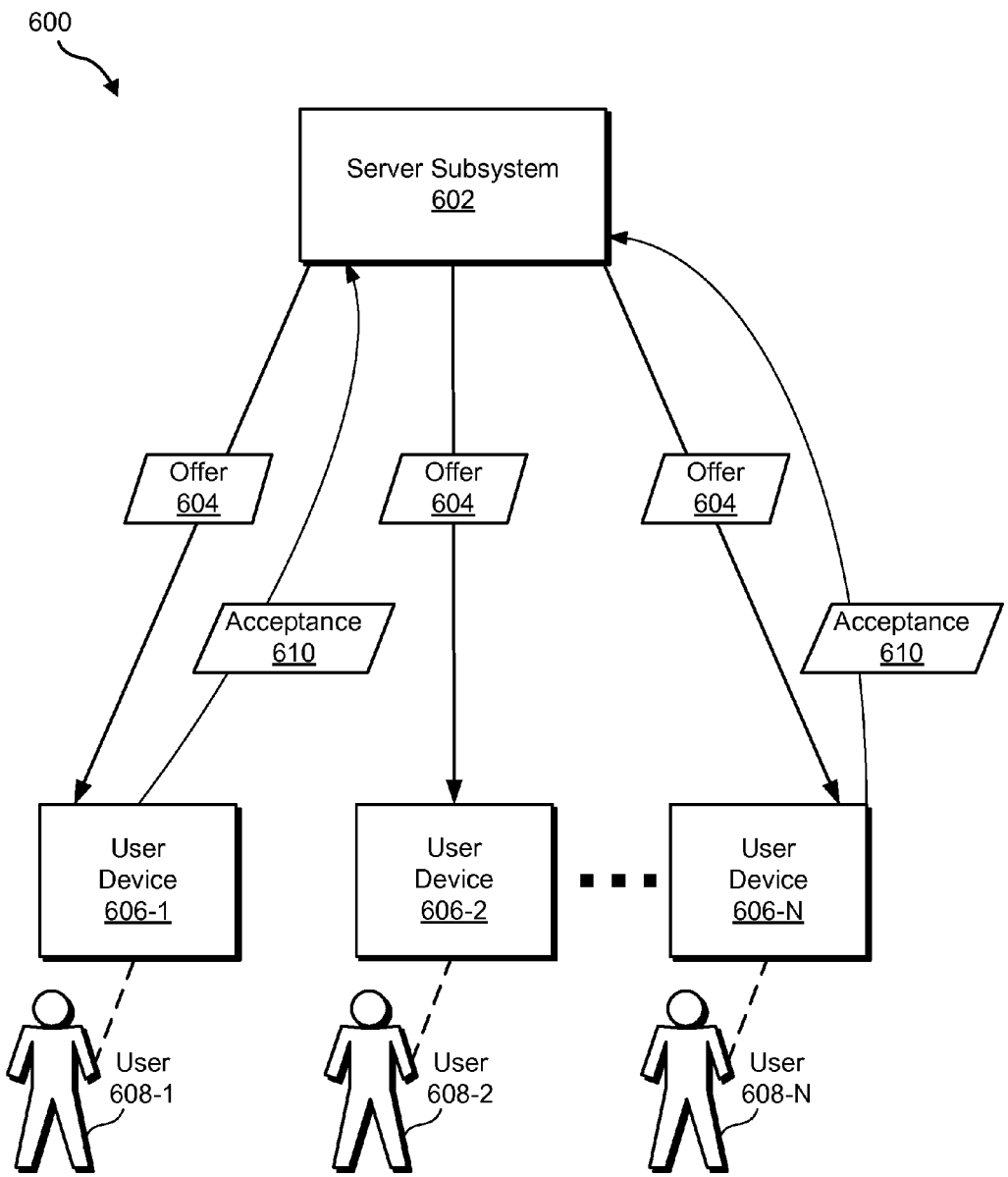
FIG. 6 illustrates an exemplary media multicast streaming event offer distribution and acceptance flow in an implementation of the system of FIG. 1 according to principles described herein.

To illustrate, FIG. 6 shows an exemplary offer distribution and acceptance flow 600 in an implementation of system 100. As shown, a server subsystem 602, which may implement or be implemented by multicast event management facility 102, may send an offer 604 to a plurality of user devices 606 (e.g., user devices 606-1 through 606-N) associated with a plurality of users 608 (e.g., users 608-1 through 608-N), who may be end users of (e.g., subscribers to) a service (e.g., a media streaming service) provided by server subsystem 602. One or more of users 608 may choose to accept offer 604 by providing input to their respective user devices 606 to indicate acceptance of offer 604. The user devices 606 respectively associated with the accepting users 608 may each send an acceptance 610 to server subsystem 602. In the illustrated example, user device 606-1 sends an acceptance 610 to indicate acceptance of offer 604 by user 608-1 and user device 606-N sends an acceptance 610 to indicate acceptance of offer 604 by user 608-N.

Server subsystem 602 may receive and use acceptances 610 to determine a group of users who have agreed to participate in the event. For example, based on the acceptances 610 received from user devices 606-1 and 606-N, server subsystem 602 may add users 608-1 and 608-N to the group of users who have agreed to participate in the event.

In certain examples, server subsystem 602 may distribute offer 604 and users devices 606 may send acceptance 610, such as shown in FIG. 6, during the offer period associated with the event (e.g., April 10-20). After the close of the offer period, multicast event management facility 102 may finalize (e.g., close) the group of users associated with the event within definition 200. Alternatively, multicast event management facility 102 may close the group of users associated with the event within definition before the close of the offer period if the group of users reaches the maximum participation level associated with the event.

After the group of users associated with the event has been closed, multicast event management facility 102 may perform operations such as registering the group of users for the event, preparing for execution of the event, and/or directing multicast streaming facility 104 to proceed with execution and/or scheduling of the event, such as described herein.

Server subsystem 602 and user devices 606 may communicate using any suitable communications technologies and/or networks that support exchange of data (e.g., data representative of offer 604 and acceptance 610, data representative of other communications, and/or data representative of streaming media content). Server subsystem 602 may include or implement one or more computing devices (e.g., server devices) configured to send offers 604 to and receive acceptances 610 from user devices 608. A user device 606 may include a computing device configured to be operated by a user 608 and to receive offers 604 from and send acceptances 610 to server subsystem 602. For example, a user device 606 may include, without limitation, a personal computer, a smartphone, a mobile phone, a set-top box, a gaming console, a consumer electronics device, a media player, and/or any other suitable user computing device.

In a "group bid" mode, multicast event management facility 102 may receive a request for a media multicast streaming event from a group of users. The request may be received in any suitable way and in any suitable form. For example, multicast event management facility 102 may receive a single request message from the group of users (e.g., from one user in the group on behalf of the group) or multiple request messages from the group of users (e.g., an individual request message from each user in the group of users). The request may be received using any communications and/or interfaces by way of which a user device may communicate with multicast event management facility 102, such as by way of social network messaging, a user portal (e.g., a web portal), a website (e.g., a media streaming service provider website), an application running on a computing device (e.g., a mobile app), etc.

In certain examples, users may coordinate with each other to organize a request to submit to multicast event management facility 102. For example, users may use social networking and/or communications technology to communicate with one another to organize a request to submit to multicast event management facility 102. To illustrate, certain users may want to be able to view live streaming video of a local event (e.g., a local sporting event such as a high school basketball or football game). The users may coordinate and submit a request to multicast event management facility 102 for a multicast streaming of video of the game.

A request may include data representing any information descriptive of the request. For example, the request may indicate the media program being requested for the event, a particular timeslot for the event, multiple timeslots proposed by the group of users from which multicast event management facility 102 may select a timeslot for the event, a priority ranking of the multiple timeslots to reflect preferences of the group of users, a number of users associated with the request, user information for the users in the group of users, and any other information associated with the request.

Multicast event management facility 102 may generate a definition of a media multicast streaming event based on the request from the group of users (e.g., in response to and/or based on information in the request). To illustrate, multicast event management facility 102 may receive a request for a media multicast streaming event for a media program such as live video of a particular high school basketball game. In response, multicast event management facility 102 may define the event.

In defining the event, multicast event management facility 102 may use information included in the request as well as information accessed from other sources of information. For example, multicast event management facility 102 may use information received from a media multicast streaming service provider and/or from a content source from which the service provider may obtain the requested media program (e.g., from a local studio). Multicast event management facility 102 may also base the definition of the event on a group multicast price model such as price model 400 shown in FIG. 4, such as described herein.

To illustrate, multicast event management facility 102 may receive a request for video of a high school basketball game. For example, a group of users may use a social networking platform to communicate to organize and submit the request for the video of the high school basketball game to multicast event management facility 102 operated by a multicast streaming service provider. Multicast event management facility 102 may receive the request and communicate with a content source (e.g., a local studio) from which the video of the game may be accessed and use information received from the content source to determine a price point for a media multicast streaming event. For example, multicast event management facility 102 may receive information indicating a content cost from the content source and apply the content cost to price model 400 to determine an appropriate unit price to charge each user included in a group of users for access to the video of the game by way of a multicast streaming event. Multicast event management facility 102 may make this determination based on the current number of users in the group of users requesting the event and/or on a minimum participation level associated with the event.

In certain examples, multicast event management facility 102 may communicate with multiple potential content sources to determine one or more options for accessing the requested video. For example, multicast event management facility 102 may request and receive information from potential content sources about content costs and/or available content quality. The service provider operating multicast event management facility 102 may then select a content source and/or a version of content (e.g., high quality versus low quality video) to access and provide to the group of users in response to the request.

The "group bid" mode may allow a multicast streaming service provider to act as a bid facilitator between a group of users and one or more content sources. This may allow a group of users, which may be small or large in number, with a common interest to access media content that may otherwise not be available, or seldom be available, through other media channels.

The definition of the event generated by multicast event management facility 102 based on the request may specify one or more characteristics of the event. For example, the definition of the event may specify, without limitation, a media program associated with the event (e.g., a media program to be multicast streamed when the event is executed), a timeslot for the event (e.g., a timeslot during which a media program is to be streamed when the event is executed), a minimum participation level for the event (e.g., a minimum number of participants in a multicast streaming of a media program during a timeslot), a maximum participation level for the event (e.g., a maximum number of participants in a multicast streaming of a media program during a timeslot), a request period during which users are able to request participation in the event, a unit price for participation in the event, and/or any other characteristic of the event.

FIG. 7 illustrates an exemplary definition 700 of a media multicast streaming event. In the illustrated example, definition 700 specifies that live video of a local high school game is associated with the event, a request period during which users may request to participate in the event is from the present time to January 20, the game video is scheduled to be multicast streamed during a timeslot on January 21$^{st}$ from 7:00-9:00 PM Mountain Time, the event has a minimum participation level of ten participants, the event has a maximum participation level of fifty participants, and that a user group for the event (e.g., a group of users that have agreed to participate in the event) currently includes twenty-five users.

Multicast event management facility 102 may be configured to update the definition of an event. For example, when the number of users included in the user group increases through the reception of additional requests, multicast event management facility 102 may update the definition to reflect the new group of users. For instance, an additional request for multicast streaming of the same media program may be received and the requestor added to an existing group of users associated with the event.

As another example, if the number of users included in the group of users associated with the event reaches a certain level of participation, multicast event management facility 102 may be configured to adjust the unit price of the event. For instance, multicast event management facility 102 may lower the unit price in response to the number of users reaching a certain participation level. In this or a similar manner, multicast event management facility 102 may offer an incentive (e.g., discounted access to a media program) based on the size of the group of users who have requested to participate in the event.

In certain examples, multicast event management facility 102 may be configured to combine elements of the "group offer" and "group bid" modes into a hybrid mode. For example, multicast event management facility 102 may receive a request for a media multicast streaming event from a group of users and define the event based on the request. Multicast event management facility 102 may then release an offer for the event to one or more additional potential participants (e.g., social networking contacts of the users included in the group of users). Multicast event management facility 102 may receive one or more acceptances of the offer and add accepting users to the group of users. In this or a similar manner, multicast event management facility 102 may facilitate growth of the group of users associated with the event.

System 100 may be configured to interact with and/or leverage one or more social networking platforms and/or services. For example, multicast event management facility 102 may be configured to use a social network platform to advertise a media multicast streaming event, such as by distributing an offer for the event to users of the social networking platform. This may help a user group of sufficient size to produce economies of scale to learn of and agree to participate in the event.

As another example, system 100 may interact with and/or leverage a social networking platform and/or service to facilitate interaction between users who are concurrently experiencing the same media program during execution of a media multicast streaming event. The users may interact with one another in real-time during the execution of the event by way of the social networking platform. In certain examples, system 100 may be configured to interact with the social networking platform to present data representative of the user interactions together with the presentation of the media program associated with the event. For example, the social network platform may send data representative of user interactions between the users in the group and associated with the event to system 100, which may forward the interaction data to user devices for presentation by the user devices.

Figure 8:
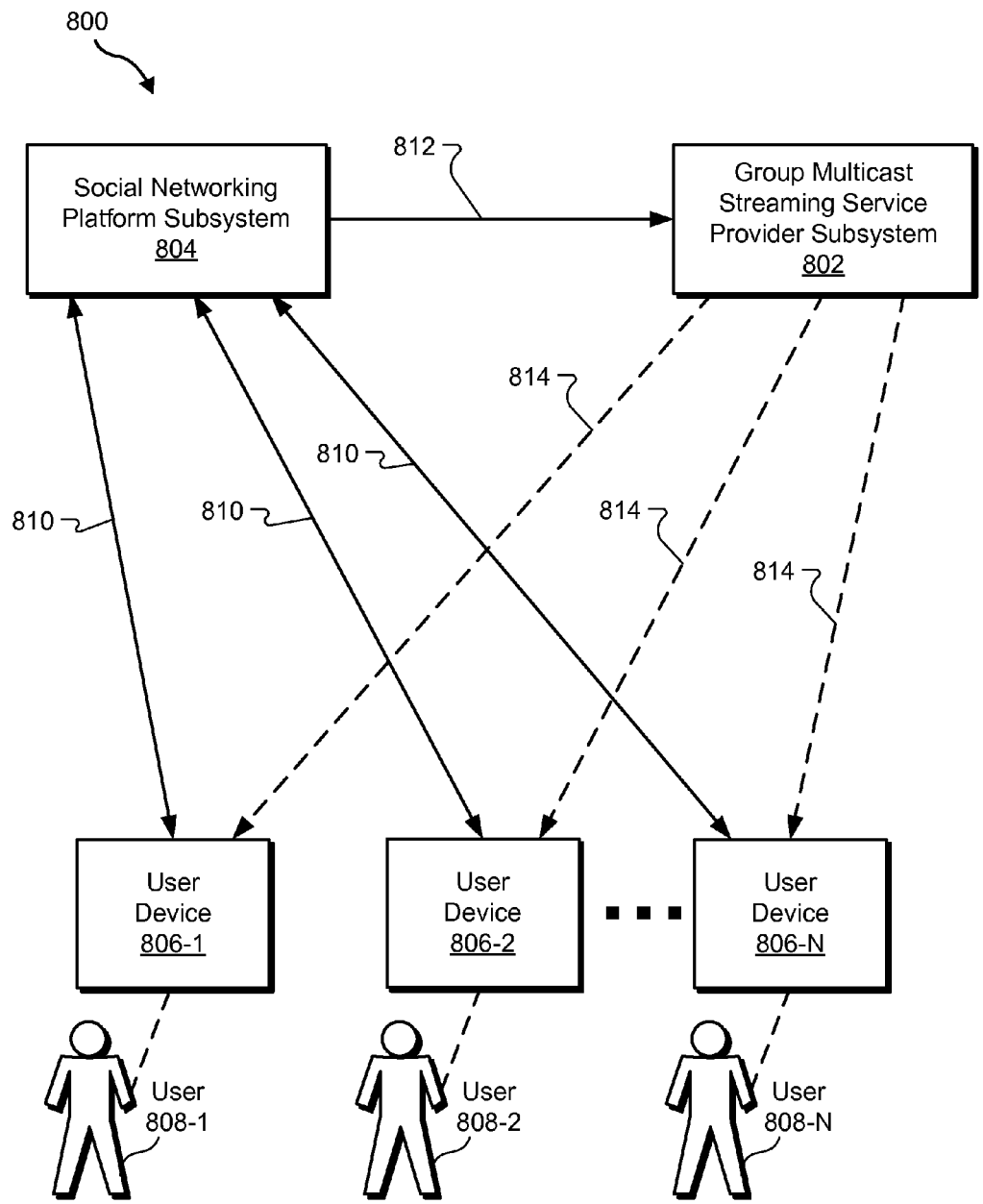
FIG. 8 illustrates an exemplary user interaction message flow in an implementation of the system of FIG. 1 according to principles described herein.

FIG. 8 illustrates an exemplary implementation 800 of system 100 in which a group multicast streaming service provider subsystem 802 is configured to interact with a social networking platform subsystem 804. To illustrate, service provider subsystem 802 may perform one or more operations described herein to provide a media multicast streaming event such as by multicast streaming a media program to user devices 806 (e.g., user devices 806-1 through 806-N) associated with users 808 (e.g., users 808-1 through 808-N). During the streaming of the media program, users 808 may experience the media program as presented by user devices 806. Users 808 may concurrently interact with one another by way of social networking platform subsystem 804. Arrows 810 represent social networking interaction messages transmitted between user devices 806 and social networking platform subsystem 804.

Social networking platform subsystem 804 may share data representative of the interaction messages with service provider subsystem 802, as represented by arrow 812 in FIG. 8. Service provider subsystem 802 may be configured to forward data representative of the interaction messages to user device 806, as represented by arrows 814 in FIG. 8. User device 806 may receive the data representative of the interaction message and present the interaction messages to users 806 together with the presentation of the media program to users 806.

Service provider subsystem 802, social networking platform subsystem 804, and user devices 806 may communicate using any suitable communications technologies and/or networks that support exchange of data (e.g., data representative of social networking messages and/or data representative of other communications. Service provider subsystem 802 and social networking platform subsystem 804 may each include or implement one or more computing devices (e.g., server devices). A user device 806 may include a computing device configured to be operated by a user 808 and to communicate with service provider subsystem 802 and social networking platform subsystem 804, such as any of the exemplary computing devices mentioned herein.

System 100 may be associated with a media streaming service such as a video-on-demand service. To illustrate, a media streaming service provider may operate a media streaming service that is configured to stream media on-demand by way of unicast streaming technology. In addition to on-demand media streaming, the media streaming service may be configured to multicast stream media by way of multicast streaming technology in any of the ways described herein. Accordingly, an end-user of the media streaming service may be able to choose from unicast and multicast streaming features within the service.

For example, a user of a media streaming service may provide, through an interface to the service, a request to stream a popular media program on-demand. The request may be received at 7:45 PM. In response to the request, the service may provide the user with information about one or more options for accessing the same media program by way of a multicast streaming event. For instance, multicast event management facility 102 may inform the user that a discounted multicast streaming event for the same media program is planned to begin at 8:00 PM and provide an option (e.g., in the same interface) for selection by the user to sign up to participate in the multicast streaming event. If the user elects to participate in the multicast streaming event rather than unicast streaming the media program on-demand, the user may be able to receive an incentive provided by the service provider (e.g., the user may access the media program at a discounted price). In addition, the service provider may conserve resources and/or experience one or more other benefits by multicast streaming the media program to the user where the user is part of a group of users participating in the multicast streaming.

In certain examples, multicast event management facility 102 may be configured to present a user with such an option to join a multicast streaming event in response to the user requesting access to the media program within a predefined temporal proximity of the timeslot of the event (e.g., within thirty minutes before the start of the timeslot and/or within ten minutes after the start of the timeslot).

A media multicast streaming service provider may promote a media multicast streaming event in any suitable way and/or to any suitable set of potential participants. In certain examples, for instance, the multicast streaming service provider may plan periodic media multicast streaming events around a particular theme. For example, a multicast streaming service provider may offer a standing Saturday night movie multicast streaming event. Though each instance of the standing event may be canceled if a minimum participation level is not satisfied, as described herein, the predictable nature of the weekly event may make the satisfaction of the minimum participation level more likely than it would be for an unpredictable event. Themes for such planned periodic events may include any motifs that interest a group of people. For example, a themed movie night may feature classic selections from a certain decade (e.g., "Movies of the 80s"), a particular actor (e.g., "John Wayne Classics"), a popular director (e.g., "Alfred Hitchcock Thrillers"), etc. Additionally or alternatively, themes may center on particular genres (e.g., "comedies"), niches (e.g. "vampire movies") and/or any other suitable theme (e.g., "critics' choice").

As another example, while users may not typically watch television programs several years after the programs have ended production and/or gone off the air, certain users may be more likely to re-watch a favorite television series or to discover a television series for the first time if the user learns (e.g., through a friend on a social networking site) that a group of people (perhaps comprising friends or acquaintances of the user) plans to watch the television show on a regular basis. This type of implementation may be particularly effective with "cult" television shows already possessing a large fan base. For example, long-time fans of the television program titled "I Love Lucy" may subscribe to a group offer called "Lucy Lunch Breaks" that allows fans to concurrently watch and discuss episodes of "I Love Lucy" every weekday at noon. In such an example, users may be able to join media multicast streaming events on a case-by-case basis, or may be able to purchase access to an entire season or series of media multicast streaming events as part of a package deal offered by multicast event management facility 102.

As another example, popular media programs (e.g., new releases, etc.) may be in sufficient demand to allow a multicast streaming service provider to plan periodic showings of the popular media programs according to their popularity (e.g., every other hour during the day and once an hour in the evenings). Because a large number of users may be statistically likely to subscribe to the popular media program at predictable times, media multicast streaming events may be offered with a high likelihood that minimum participation levels will be satisfied.

As another example, a group bid may be facilitated by a multicast streaming service provider. For instance, multicast event management facility 102 may provide a tool for use by users to create and/or find multicast streaming event clubs (e.g., "movie clubs") centered on particular topics. Users who participate in such a club may interact to submit a request for a media multicast streaming event to multicast event management facility 102. For example, members of a romantic comedy movie club may agree to submit a group bid for a romantic comedy multicast streaming event every Sunday at 8:00 PM. The members of the club may take turns selecting the movie of the week and may discuss and analyze the movie via email, chat, or social networking during and/or after the multicast streaming event.

As another example, multicast event management facility 102 may be configured to provide a tool for use by users to find planned media multicast streaming events. For example, the tool may allow users to browse information about the planned events. The information about the events may specify current, minimum, and/or maximum participation levels, incentives, and/or other characteristics of the events.

Figure 9:
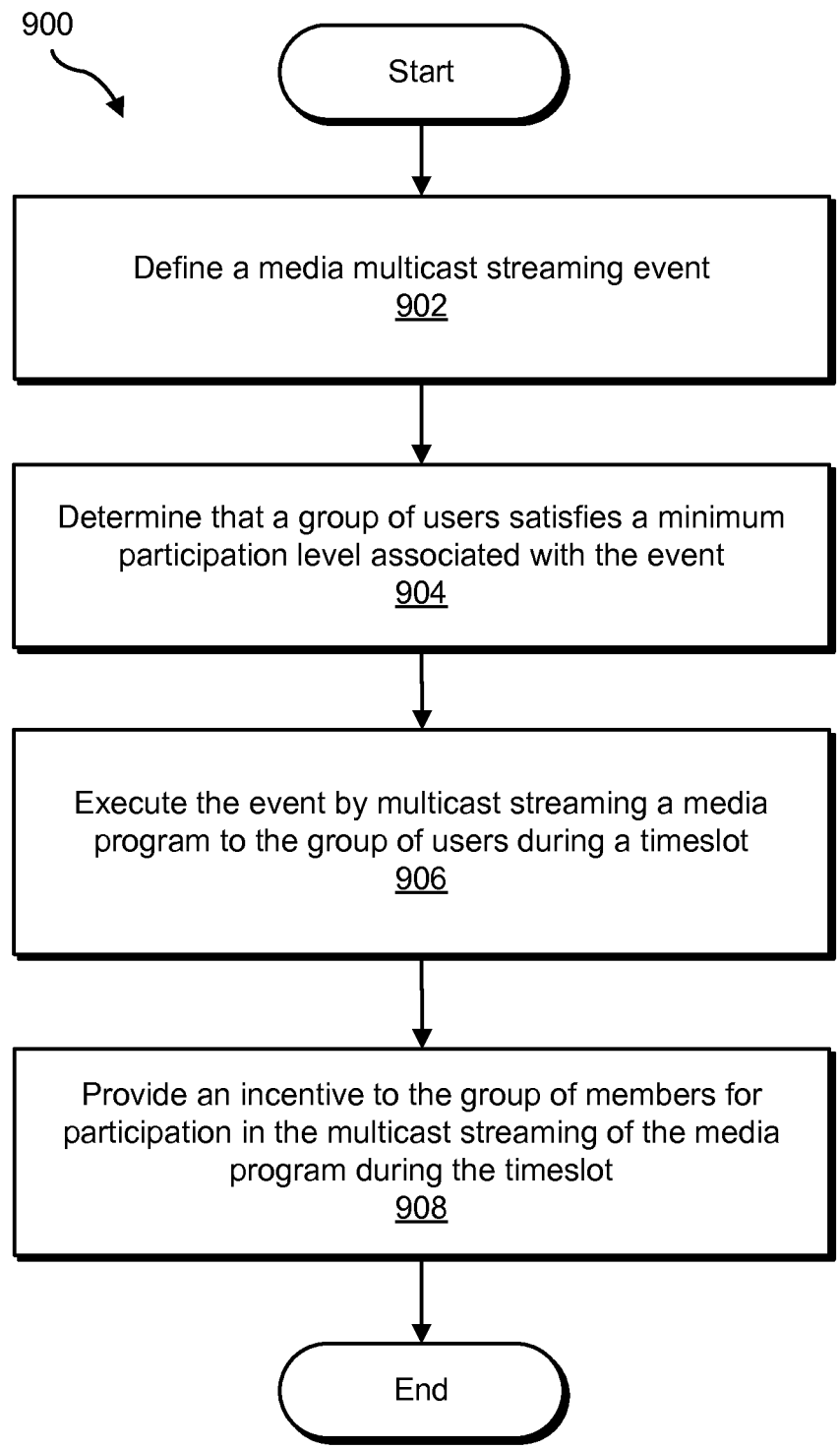
FIGS. 9-11 illustrate exemplary group based multicast streaming methods according to principles described herein.
Figure 10:
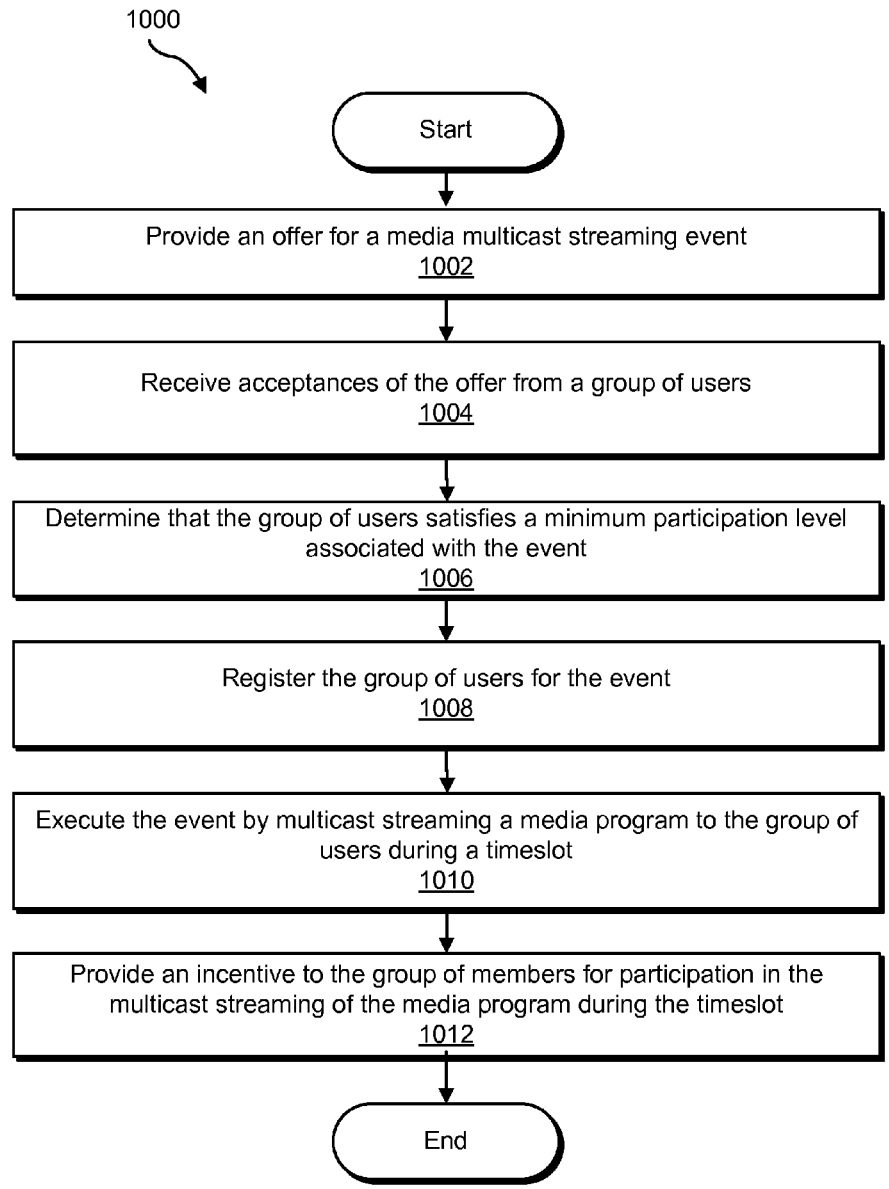
Figure 11:
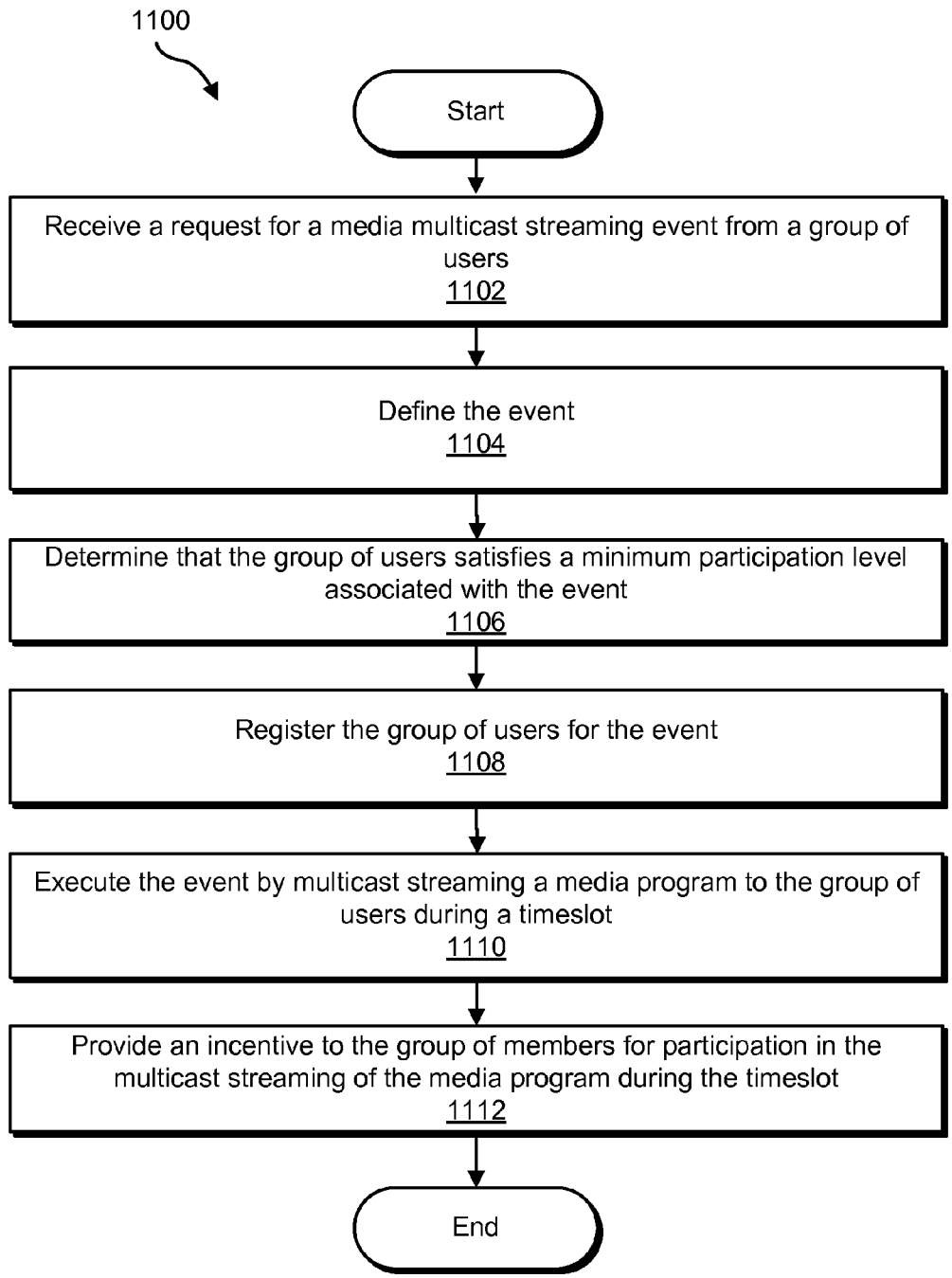

FIGS. 9-11 illustrate exemplary group based multicast streaming methods according to principles described herein. While FIGS. 9-11 illustrate exemplary steps according to certain embodiments, other embodiments may omit, add to, reorder, combine, and/or modify any of the steps shown in FIGS. 9-11. In certain embodiments, one or more of the steps shown in FIGS. 9-11 may be performed by system 100 and/or one or more components or implementations of system 100 (e.g., by streaming server 304, server subsystem 602, or server provider subsystem 802).

Turning now to method 900 shown in FIG. 9, in step 902, system 100 defines a media multicast streaming event. Step 902 may be performed in any of the ways described herein. For example, system 100 may define the event in accordance with a group offer mode, a group bid mode, or a hybrid thereof, such as described herein.

In step 904, system 100 determines that a group of users satisfies a minimum participation level associated with the event, such as described herein.

In step 906, system 100 executes the event by multicast streaming a media program to the group of users during a timeslot. Step 906 may be performed in any of the ways described herein. For example, based on the determination in step 904, system 100 may multicast stream the media program to user devices associated with the group of users during the timeslot.

In step 908, system 100 provides an incentive to the group of users for participation in the multicast streaming of the media program during the timeslot. Step 908 may be performed in any of the ways described herein, including, for example, by providing an incentive indicating a potential to earn a reward for participation in the multicast streaming and/or by providing an incentive indicating that a reward has been earned for participation in the multicast streaming.

Turning now to method 1000 shown in FIG. 10, in step 1002, system 100 provides an offer for a media multicast streaming event. System 100 may provide the offer in any of the ways described herein.

In step 1004, system 100 receives acceptances of the offer from a group of users. System 100 may receive the acceptances in any of the ways described herein.

In step 1006, system 100 determines that a group of users satisfies a minimum participation level associated with the event, such as described herein.

In step 1008, system 100 registers the group of users for the event. Step 1008 may be performed in any of the ways described herein and may include system 100 obtaining and using information about the users and/or user devices associated with the users to prepare for execution of the event in advance of the start of the timeslot. Step 1008 may be performed in response to the determination in step 1006.

In step 1010, system 100 executes the event by multicast streaming a media program to the group of users during a timeslot. Step 906 may be performed in any of the ways described herein. For example, in response to the determination in step 1006, system 100 may multicast stream the media program to user devices associated with the group of users during the timeslot.

In step 1012, system 100 provides an incentive to the group of users for participation in the multicast streaming of the media program during the timeslot, such as described herein.

Turning now to method 1100 shown in FIG. 11, in step 1102, system 100 receives a request for a media multicast streaming event from a group of users. Step 1102 may be performed in any of the ways described herein.

In step 1104, system defines the event, such as described herein. Step 1104 may be performed in response to the request received in step 1102.

In step 1106, system 100 determines that a group of users satisfies a minimum participation level associated with the event, such as described herein.

In step 1108, system 100 registers the group of users for the event, such as described herein.

In step 1110, system 100 executes the event by multicast streaming a media program to the group of users during a timeslot, such as described herein.

In step 1012, system 100 provides an incentive to the group of users for participation in the multicast streaming of the media program during the timeslot, such as described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 12:
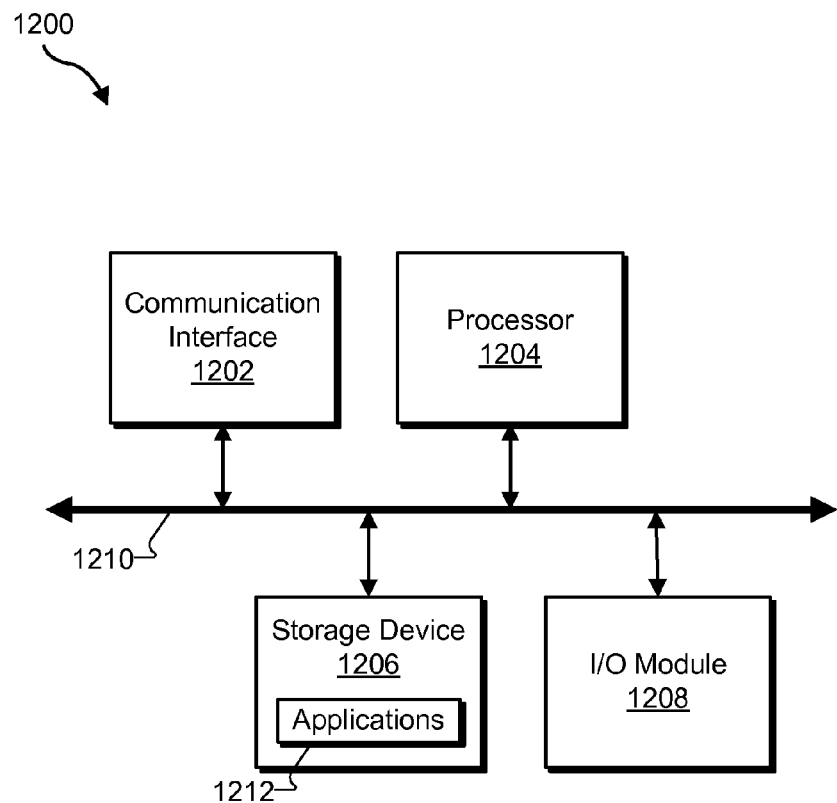
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. Communication interface 1202 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1202 may be configured to interface with any suitable communication media, protocols, and formats.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another non-transitory computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with one or more of the facilities described herein. Likewise, any of the storage facilities described herein may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. As another example, while certain exemplary embodiments are directed to multicast streaming events, in certain alternative embodiments, peer-to-peer streaming technologies may be employed in place of or in addition to multicast streaming technologies. Accordingly, one or more of the principles described herein may be applied to or employ group based peer-to-peer media streaming. The description and drawings are accordingly to be regarded in an illustrative rather than a restrictive sense.

What is claimed is:

1. A method comprising:
    defining, by a group based multicast streaming system, a media multicast streaming event;
    determining, by the group based multicast streaming system, that a group of users satisfies a minimum participation level associated with the media multicast streaming event;
    executing, by the group based multicast streaming system based on the determined satisfaction of the minimum participation level by the group of users, the media multicast streaming event by multicast streaming a media program to the group of users during a timeslot; and
    providing, by the group based multicast streaming system, an incentive to the group of users for participation in the multicast streaming of the media program during the timeslot.

2. The method of claim 1, wherein the incentive comprises discounted access to the media program.

3. The method of claim 1, further comprising:
    providing, by the group based multicast streaming system, an offer for the media multicast streaming event; and
    receiving, by the group based multicast streaming system during an offer time period, acceptances of the offer from the group of users;
    wherein the defining comprises determining the group of users associated with the media multicast streaming event based on the received acceptances of the offer.

4. The method of claim 1, further comprising:
    receiving, by the group based multicast streaming system, a request for the media multicast streaming event from the group of users;
    wherein the defining of the media multicast streaming event is performed in response to the request.

5. The method of claim 4, wherein the receiving of the request comprises receiving an individual request for the media multicast streaming event from each user included in the group of users.

6. The method of claim 4, wherein the receiving of the request comprises receiving a single request on behalf of the group of users.

7. The method of claim 1, wherein the defining comprises determining the minimum participation level based on data representative of a group multicast price model.

8. The method of claim 1, wherein the defining comprises determining a maximum participation level for the media multicast streaming event based on data representative of a group multicast price model.

9. The method of claim 8, further comprising capping, by the group based multicast streaming system, the participation in the media multicast streaming event based on the maximum participation level.

10. The method of claim 1, further comprising providing, by the group based multicast streaming system, data representative of one or more social networking interaction messages between one or more users included in the group of users for presentation together with the media program during the timeslot.

11. The method of claim 1, further comprising registering, by the group based multicast streaming system based on the determined satisfaction of the minimum participation level, the group of users for the media multicast streaming event.

12. The method of claim 11, wherein:
    the registering comprises obtaining information about user devices associated with the group of users; and
    the registering is performed in response to the determined satisfaction of the minimum participation level and in advance of a start of the timeslot.

13. The method of claim 1, embodied as computer-executable instructions on at least one non-transitory computer-readable medium.

14. A method comprising:
    providing, by a group based multicast streaming system, an offer for a media multicast streaming event;
    receiving, by the group based multicast streaming system, acceptances of the offer from a group of users;
    determining, by the group based multicast streaming system, that the group of users satisfies a minimum participation level; and in response to the determined satisfaction of the minimum participation level by the group of users,
registering, by the group based multicast streaming system, the group of users for the media multicast streaming event, and
executing, by the group based multicast streaming system, the media multicast streaming event by multicast streaming a media program to the group of users during a timeslot.

15. The method of claim 14, wherein:
the registering comprises obtaining information about user devices associated with the group of users; and
the registering is performed in advance of a start of the timeslot.

16. The method of claim 14, further comprising:
providing, by the group based multicast streaming system, an incentive to the group of users for participation in the multicast streaming of the media program during the timeslot;
wherein the incentive comprises discounted access to the media program.

17. A method comprising:
receiving, by a group based multicast streaming system, a request for a media multicast streaming event from a group of users;
defining, by the group based multicast streaming system in response to the request, the media multicast streaming event;
determining, by the group based multicast streaming system, that the group of users satisfies a minimum participation level; and
in response to the determined satisfaction of the minimum participation level by the group of users,
registering, by the group based multicast streaming system, the group of users for the media multicast streaming event, and
executing, by the group based multicast streaming system, the media multicast streaming event by multicast streaming a media program to the group of users during a timeslot.

18. The method of claim 17, wherein:
the registering comprises obtaining information about user devices associated with the group of users; and
the registering is performed in advance of a start of the timeslot.

19. The method of claim 17, further comprising:
providing, by the group based multicast streaming system, an incentive to the group of users for participation in the multicast streaming of the media program during the timeslot;
wherein the incentive comprises discounted access to the media program.

20. The method of claim 17, wherein the receiving of the request comprises receiving an individual request for the media multicast streaming event from each user included in the group of users.

21. The method of claim 17, wherein the receiving of the request comprises receiving a single request on behalf of the group of users.

22. A system comprising:
a multicast event management facility configured to define a media multicast streaming event and to determine that a group of users satisfies a minimum participation level associated with the media multicast streaming event;
a multicast streaming facility communicatively coupled to the multicast event management facility and configured to execute, based on the determined satisfaction of the minimum participation level by the group of users, the media multicast streaming event by multicast streaming a media program to the group of users during a timeslot; and
an incentive facility communicatively coupled to the multicast event management facility and configured to provide an incentive to the group of users for participation in the multicast streaming of the media program during the timeslot.

23. The method of claim 1, wherein the group of users satisfies the minimum participation level when a predetermined minimum number of users agree to participate in the media multicast streaming event.

* * * * *